United States Patent
Murakami

(10) Patent No.: US 11,057,822 B2
(45) Date of Patent: Jul. 6, 2021

(54) ELECTRONIC APPARATUS, WIRELESS COMMUNICATION METHOD, AND COMPUTER PROGRAM PRODUCT

(71) Applicant: KABUSHIKI KAISHA TOSHIBA, Minato-ku (JP)

(72) Inventor: Takaomi Murakami, Kamakura (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 61 days.

(21) Appl. No.: 16/562,700

(22) Filed: Sep. 6, 2019

(65) Prior Publication Data
US 2020/0178154 A1 Jun. 4, 2020

(30) Foreign Application Priority Data
Nov. 29, 2018 (JP) .............................. JP2018-224104

(51) Int. Cl.
*H04W 72/00* (2009.01)
*H04W 40/26* (2009.01)
*H04W 40/12* (2009.01)
*H04L 12/801* (2013.01)
*H04L 12/721* (2013.01)

(52) U.S. Cl.
CPC ............. *H04W 40/26* (2013.01); *H04L 47/17* (2013.01); *H04W 40/12* (2013.01); *H04L 45/12* (2013.01)

(58) Field of Classification Search
None
See application file for complete search history.

(56) References Cited

U.S. PATENT DOCUMENTS

| | | | |
|---|---|---|---|
| 7,940,660 B2 * | 5/2011 | Zhu ....................... | H04L 65/104 370/230.1 |
| 2008/0130549 A1 * | 6/2008 | Chindapol ............ | H04W 40/24 370/315 |
| 2009/0147722 A1 * | 6/2009 | Ramachandran ..... | H04L 45/122 370/315 |
| 2010/0098047 A1 * | 4/2010 | Zhou ..................... | H04W 28/22 370/345 |
| 2010/0302992 A1 * | 12/2010 | Zhuang ................. | H04W 40/02 370/313 |
| 2011/0110345 A1 * | 5/2011 | Heidari ................. | H04W 40/06 370/338 |

(Continued)

FOREIGN PATENT DOCUMENTS

WO    WO 2017/098859 A1    6/2017

*Primary Examiner* — Brandon M Renner
(74) *Attorney, Agent, or Firm* — Oblon, McClelland, Maier & Neustadt, L.L.P.

(57) ABSTRACT

According to an embodiment, an electronic apparatus includes communication circuitry and processing circuitry. The communication circuitry is configured to transmit a first packet to a first next hop and transmit a second packet to a second next hop in accordance with communication control information. The processing circuitry is configured to measure first information on the first packet transmitted to the first next hop, measure second information on the second packet transmitted to the second next hop, determine whether to change the communication control information based on both the first information and the second information, and change the communication control information if it is determined to change the communication control information.

8 Claims, 9 Drawing Sheets

(56) References Cited

U.S. PATENT DOCUMENTS

| | | | |
|---|---|---|---|
| 2016/0134465 A1* | 5/2016 | Zhang | H04L 47/70 370/221 |
| 2016/0323175 A1* | 11/2016 | Liu | H04L 12/6418 |
| 2017/0273004 A1* | 9/2017 | Park | H04W 40/248 |
| 2018/0083855 A1* | 3/2018 | Weiny | H04L 41/0668 |
| 2018/0376368 A1 | 12/2018 | Shoji et al. | |

* cited by examiner

FIG.4A

| NEXT HOP ID | LINK THROUGHPUT | TRANSMISSION BIT RATE |
|---|---|---|
| abcd::1 | 100 | 95 |
| abcd::2 | 100 | 80 |
| abcd::3 | 100 | 70 |

FIG.4B

| NEXT HOP ID | LINK THROUGHPUT | TRANSMISSION BIT RATE |
|---|---|---|
| abcd::1 | 100 | 90 |
| abcd::2 | 100 | 85 |
| abcd::3 | 100 | 70 |

FIG.5A

| NEXT HOP ID | LINK THROUGHPUT | TRANSMISSION BIT RATE | PRIORITY |
|---|---|---|---|
| abcd::1 | 100 | 95 | HIGH |
| abcd::2 | 100 | 60 | HIGH |
| abcd::3 | 100 | 70 | HIGH |
| abcd::1 | 100 | 5 | LOW |

FIG.5B

| NEXT HOP ID | LINK THROUGHPUT | TRANSMISSION BIT RATE | PRIORITY |
|---|---|---|---|
| abcd::1 | 100 | 90 | HIGH |
| abcd::2 | 100 | 65 | HIGH |
| abcd::3 | 100 | 70 | HIGH |
| abcd::1 | 100 | 5 | LOW |

FIG.8A

| TRANSMISSION SOURCE ID | TRANSMISSION DESTINATION ID | LINK THROUGHPUT | TRANSMISSION BIT RATE |
|---|---|---|---|
| abcd::2 | abcd::11 | 100 | 90 |
| abcd::2 | abcd::12 | 50 | 45 |
| abcd::2 | abcd::13 | 50 | 45 |

FIG.8B

| TRANSMISSION SOURCE ID | TRANSMISSION DESTINATION ID | LINK THROUGHPUT | TRANSMISSION BIT RATE |
|---|---|---|---|
| abcd::3 | abcd::14 | 100 | 50 |
| abcd::3 | abcd::15 | 50 | 40 |
| abcd::3 | abcd::16 | 50 | 30 |

| TRANSMISSION SOURCE ID | TRANSMISSION DESTINATION ID | LINK THROUGHPUT | TRANSMISSION BIT RATE |
|---|---|---|---|
| abcd::2 | abcd::11 | 100 | {HIGH PRIORITY, 10}, {LOW PRIORITY, 20} |
| abcd::2 | abcd::12 | 50 | {HIGH PRIORITY, 10}, {LOW PRIORITY, 20} |
| abcd::2 | abcd::13 | 50 | {LOW PRIORITY, 30} |

ELECTRONIC APPARATUS, WIRELESS COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2018-224104, filed on Nov. 29, 2018; the entire contents of which are incorporated herein by reference.

FIELD

Embodiments described herein relate generally to an electronic apparatus, a wireless communication method, and a computer program product.

BACKGROUND

Hitherto, techniques that implement Quality of Service (QoS) control over the whole transmission paths of networks have been known. For example, hitherto, techniques that implement the QoS control on a network based on an Optimized LinkState Routing (OLSR) protocol have been known. A related art example is described in WO2017/098859.

In conventional techniques, in the case where the throughput performance of a transmission path is below that required for the transmission of traffic due to changes in the wireless environment, it is difficult to transmit the traffic without delay. In the case where the throughput performance of the transmission path is below that required for transmission of traffic, buffering of packets is required until the wireless environment is recovered.

BRIEF DESCRIPTION OF THE DRAWINGS

FIG. 4A is a diagram illustrating an example of communication control information in the first embodiment;

FIG. 4B is a diagram illustrating a changed example of communication control information in the first embodiment;

FIG. 5A is a diagram illustrating an example of communication control information in a second embodiment;

FIG. 5B is a diagram illustrating a changed example of communication control information in the second embodiment;

FIG. 8A is a diagram illustrating Example 1 of information on a next hop in the third embodiment;

FIG. 8B is a diagram illustrating Example 2 of information on a next hop in the third embodiment;

DETAILED DESCRIPTION

According to an embodiment, an electronic apparatus includes communication circuitry and processing circuitry. The communication circuitry is configured to transmit a first packet to a first next hop and transmit a second packet to a second next hop in accordance with communication control information. The processing circuitry is configured to measure first information on the first packet transmitted to the first next hop, measure second information on the second packet transmitted to the second next hop, determine whether to change the communication control information based on both the first information and the second information, and change the communication control information if it is determined to change the communication control information.

Hereinafter, with reference to the attached drawings, an embodiment of an electronic apparatus, a wireless communication method, and a computer program, will be described in detail.

First Embodiment

First, an example of a functional configuration of an electronic apparatus 10 of the first embodiment will be described.

Example of Functional Configuration

Figure 1:
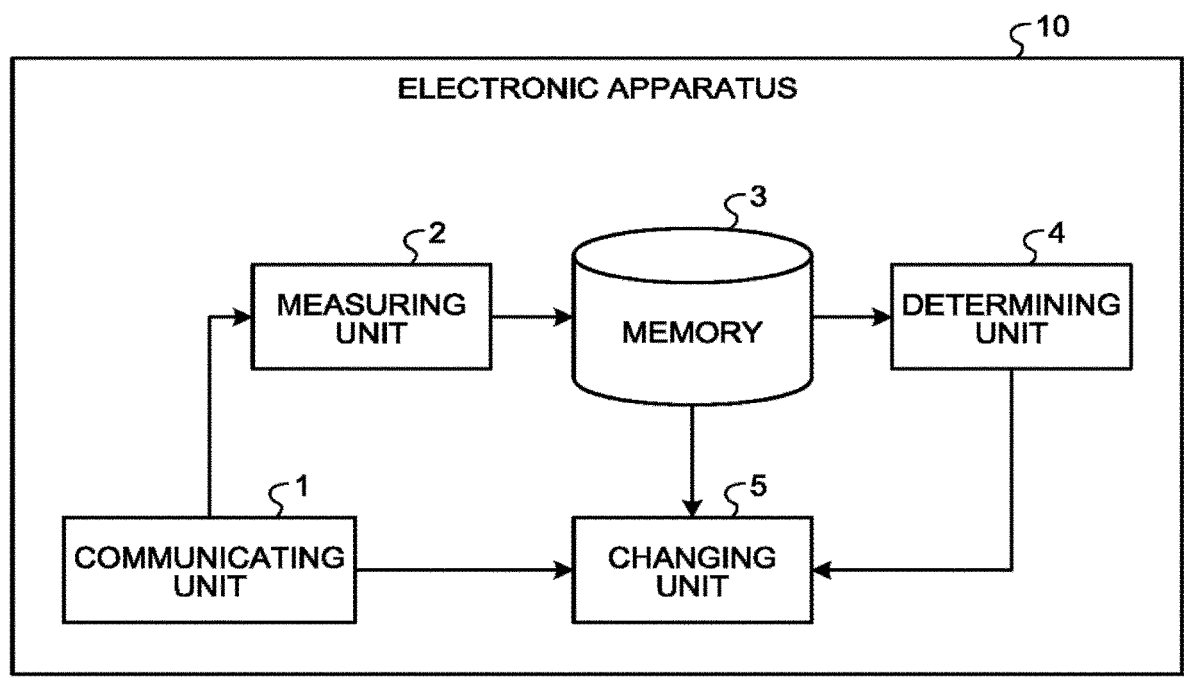
FIG. 1 is a diagram illustrating an example of a functional configuration of an electronic apparatus in a first embodiment.

FIG. 1 is a diagram illustrating an example of a functional configuration of the electronic apparatus 10 of the first embodiment. The electronic apparatus 10 of the first embodiment includes a communicating unit 1, a measuring unit 2, a memory 3, a determining unit 4, and a changing unit 5.

The communicating unit 1 transmits packets (data) to next hops in accordance with communication control information that controls communication. The communication control information is used, for example, for the control of distribution of data to be transmitted to next hops and so on. The details of the communication control information will be mentioned later.

The measuring unit 2 measures information (first information, second information) on a packet (a first packet, a second packet) communicated by the communicating unit 1. The information on a packet to be communicated by the communicating unit 1 includes, for example, a transmission/reception statistic value of a packet, the strength of a wireless signal, and so on. The transmission/reception statistic value in the first embodiment includes, for example, a link throughput between the communicating unit 1 and a next hop and a transmission bit rate of a packet transmitted to the next hop.

The memory 3 stores therein information. The memory 3 stores therein, for example, information on a packet measured by the measuring unit 2.

The determining unit 4 determines, on the basis of information on a packet measured by the measuring unit 2, whether to change the communication control information.

When it is determined that the communication control information is to be changed, the changing unit 5 changes the communication control information.

Operation Example of Measuring Unit 2

Figure 2:
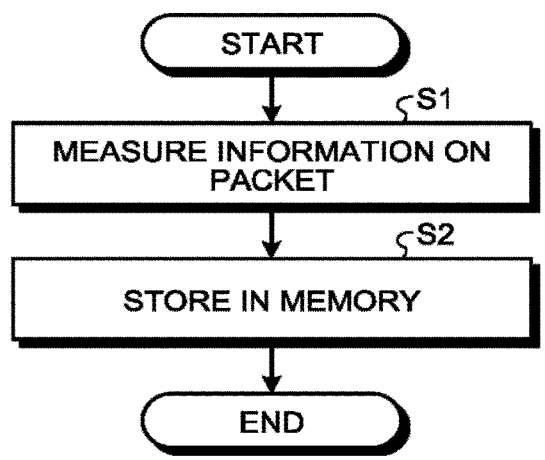
FIG. 2 is a flowchart illustrating an operation example of a measuring unit in the first embodiment.

FIG. 2 is a flowchart illustrating an operation example of the measuring unit 2 in the first embodiment. First, the measuring unit 2 measures a link throughput between the communicating unit 1 and a next hop and transmission/reception bit rate as information on a packet (Step S1).

Next, the measuring unit 2 stores the information on the packet measured by the process at Step S1, in the memory 3 (Step S2).

Operation Example of Determining Unit 4 and Changing Unit 5

Figure 3:
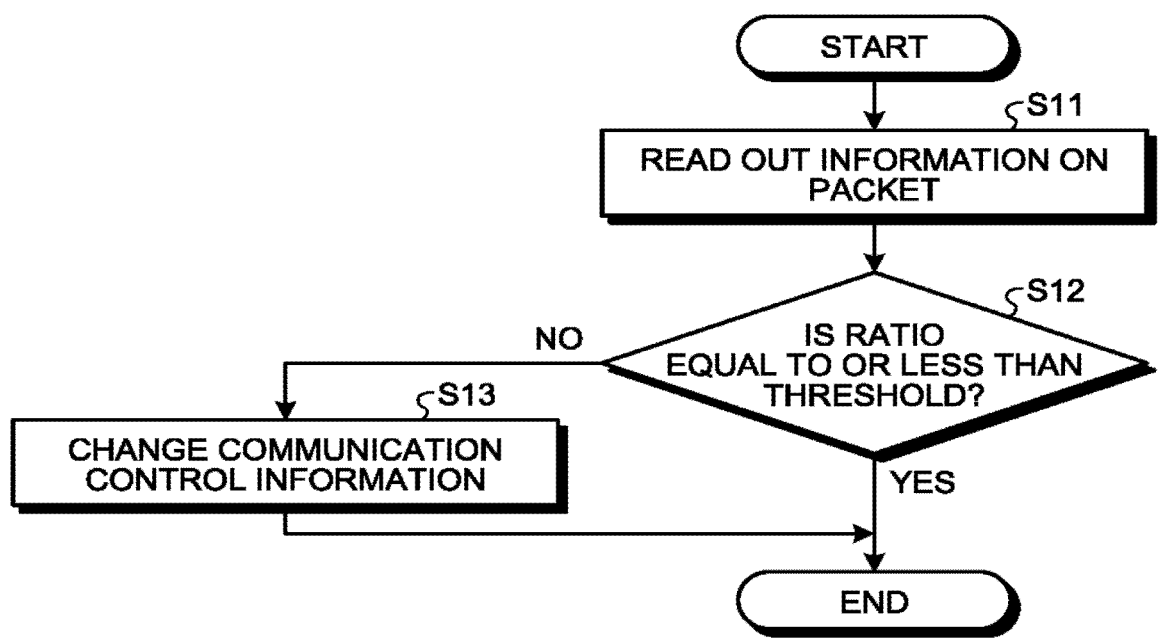
FIG. 3 is a flowchart illustrating an operation example of a determining unit and a changing unit in the first embodiment.

FIG. 3 is a flowchart illustrating an operation example of the determining unit 4 and the changing unit 5 in the first embodiment. First, the determining unit 4 reads out the information on the packet stored by the above-mentioned process at Step S1 from the memory 3 (Step S11).

Next, the determining unit 4 determines whether the ratio (first ratio) of transmission bit rate included in the information on a packet to a link throughput included in the information on the packet is equal to or less than a threshold (first threshold) (Step S12). The threshold is, for example, 90%. In the case where the ratio is equal to or less than the threshold (Yes at Step S12), the process ends.

In the case where the ratio is larger than the threshold (No at Step S12), the changing unit 5 changes the communication control information (Step S13).

Example of Communication Control Information

FIG. 4A is a diagram illustrating an example of the communication control information in the first embodiment. The communication control information according to the first embodiment includes a next-hop ID, a link throughput, and a transmission bit rate.

The next-hop ID is identification information that identifies a next hop. The next-hop ID may be any desired piece of information as long as it can identify a next hop. In an example in FIG. 4A, a next-hop ID is an IPv6 address of a next hop. In this connection, a next-hop ID may be a MAC address or the like of a next hop.

The link throughput indicates a communication speed between the electronic apparatus 10 and a next hop. The link throughput is acquired from the above-mentioned information on a packet measured by the measuring unit 2.

The transmission bit rate indicates a bit rate of data actually transmitted between the electronic apparatus 10 and a next hop. The transmission bit rate is acquired from the above-mentioned information on a packet measured by the measuring unit 2.

With regard to a next hop having a next-hop ID of abcd::1, the transmission bit rate is 95% of the link throughput. With regard to a next hop having a next-hop ID of abcd::2, the transmission bit rate is 80% of the link throughput. With regard to a next hop having a next-hop ID of abcd::3, the transmission bit rate is 70% of the link throughput.

In an example in FIG. 4A, in the case where a threshold used for the above-mentioned determining process at Step S21 is 90%, the changing unit 5 changes the communication control information such that part of data being transmitted to a next hop having a next-hop ID of abcd::1 will be transmitted to another next hop.

FIG. 4B is a diagram illustrating a changed example of the communication control information according to the first embodiment. In an example in FIG. 4B, the transmission bit rate of a packet to be transmitted to a next hop having a next-hop ID of abcd::1 is changed from 95 to 90, and the transmission bit rate of a packet to be transmitted to a next hop having a next-hop ID of abcd::2 is changed from 80 to 85. Specifically, the changing unit 5 changes the distribution ratio of data to be transmitted to the next hop having a next-hop ID of abcd::1 and to the next hop having a next-hop ID of abcd::2 such that the transmission bit rate of a packet to be transmitted to the next hop having a next-hop ID of abcd::1 will be 90 and the transmission bit rate of a packet to be transmitted to the next hop having a next-hop ID of abcd::2 will be 85. With this change, it is possible to suppress the transmission bit rate of a packet transmitted to the next hop having a next-hop ID of abcd::1 to 90% or less of the link throughput between the electronic apparatus 10 and the next hop having a next-hop ID of abcd::1.

Namely, the changing unit 5 supplements a band zone that becomes insufficient due to the lowering of a transmission bit rate by raising the transmission bit rate of another next hop. At this time, the changing unit 5 raises the transmission bit rate such that the transmission bit rate of another next hop will not exceed the threshold. The changing unit 5 raises the transmission bit rate of another next hop until the insufficiency of the band zone is cancelled. For example, in an example in FIG. 4B, in the case where the transmission bit rate of a next hop having a next-hop ID of abcd::2 also has exceeded the threshold, the changing unit 5 raises the transmission bit rate of a next hop having a next-hop ID of abcd::3 as another next hop.

As described in the above, in the electronic apparatus 10 according to the first embodiment, the communicating unit 1 transmits a packet to a next hop in accordance with the communication control information that controls communication. The measuring unit 2 measures the first information that indicates the information on a packet to be communicated by the communicating unit 1. The determining unit 4 determines whether to change the communication control information on the basis of the first information. Successively, in the case where it is determined that the communication control information is to be changed, the changing unit 5 changes the communication control information.

With this, the electronic apparatus 10 according to the first embodiment can, even if the wireless environment has changed, prevent delay and congestion of a packet. Specifically, the electronic apparatus 10 according to the first embodiment can, by distributing packets to another next hop so as to suppress the ratio of a transmission bit rate to a link throughput between the electronic apparatus 10 and a next hop to a predetermined level, prevent delay and congestion of a packet.

Second Embodiment

Next, the second embodiment will be described. In the description of the second embodiment, the similar description to that in the first embodiment will be omitted. In the second embodiment, description will be given for a case of taking the priority of a packet into consideration.

A functional configuration of the electronic apparatus 10 according to the second embodiment is the same as that according to the first embodiment (refer to FIG. 1). In the second embodiment, when the measuring unit 2 measures a packet transmission/reception statistic value as information on a packet, the measuring unit 2 measures a link throughput between the electronic apparatus 10 and a next hop and a transmission bit rate for each priority.

Example of Communication Control Information

FIG. 5A is a diagram illustrating an example of the communication control information according to the second embodiment. The communication control information according to the second embodiment includes a next-hop ID, a link throughput, a transmission bit rate, and a priority. Since the descriptions with regard to the next-hop ID, the link throughput, and the transmission bit rate are the same as those in the first embodiment, the descriptions will be omitted.

The priority indicates the priority of packet transmission. In an example in FIG. 5A, there are two types of priorities of "a high priority" and "a low priority". A packet with a high priority is, for example, a packet that includes a video image, voice, and the like. A packet with a low priority is, for example, a packet that includes data other than a video image, voice, and the like.

In this connection, the definition of the priority may be optional. As the definition of the priority, for example, the definition in IEEE 802.11e may be used, the definition in DiffServ (Differentiated Services) may be used, or other definitions may be used.

With regard to a next hop having a next-hop ID of abcd::1, the transmission bit rate of a packet with "a high priority" is 95% of the link throughput. With regard to a next hop having a next-hop ID of abcd::2, the transmission bit rate of a packet with "a high priority" is 60% of the link throughput. With regard to a next hop having a next-hop ID of abcd::3, the transmission bit rate of a packet with "a high priority" is 70% of the link throughput. Moreover, with regard to a next hop having a next-hop ID of abcd::1, the transmission bit rate of a packet with "a low priority" is 5% of the link throughput.

In an example in FIG. 5A, in the case where a threshold used for the determining process of the determining unit 4 is 90%, the changing unit 5 changes the communication control information such that part of data with a high priority that is being transmitted to a next hop having a next-hop ID of abcd::1, will be transmitted to another next hop.

FIG. 5B is a diagram illustrating a modified example of the communication control information according to the second embodiment. In an example in FIG. 5B, the transmission bit rate of a packet with "a high priority" to be transmitted to a next hop having a next-hop ID of abcd::1 is changed from 95 to 90, and the transmission bit rate of a packet with "a high priority" to be transmitted to a next hop having a next-hop ID of abcd::2 is changed from 60 to 65. Specifically, the changing unit 5 changes a distribution ratio of data with a high priority to be transmitted to a next hop having a next-hop ID of abcd::1 and to a next hop having a next-hop ID of abcd::2 such that the transmission bit rate of a packet with "a high priority" transmitted to a next hop having a next-hop ID of abcd::1, becomes 90 and the transmission bit rate of a packet with "a high priority" transmitted to a next hop having a next-hop ID of abcd::2, becomes 65.

With this change, it is possible to suppress the transmission bit rate of a packet with "a high priority" transmitted to a next hop having a next-hop ID of abcd::1 to 90% or less of the link throughput between the electronic apparatus 10 and a next hop having a next-hop ID of abcd::1.

As described in the above, the electronic apparatus 10 according to the second embodiment can, by distributing packets to another next hop so as to suppress the ratio of the transmission bit rate of a packet with a high priority to the link throughput between the electronic apparatus 10 and a next hop to a predetermined level, prevent delay and congestion of packets with a high priority.

Third Embodiment

Next, the third embodiment will be described. In the description in the third embodiment, the description similar to that in the first embodiment will be omitted. In the third embodiment, description is given for a case where transmission/reception statistic values are collected also from adjacent electronic apparatuses and the ratio of a transmission bit rate to a throughput is adjusted within a predetermined range.

Example of Functional Configuration

Figure 6:
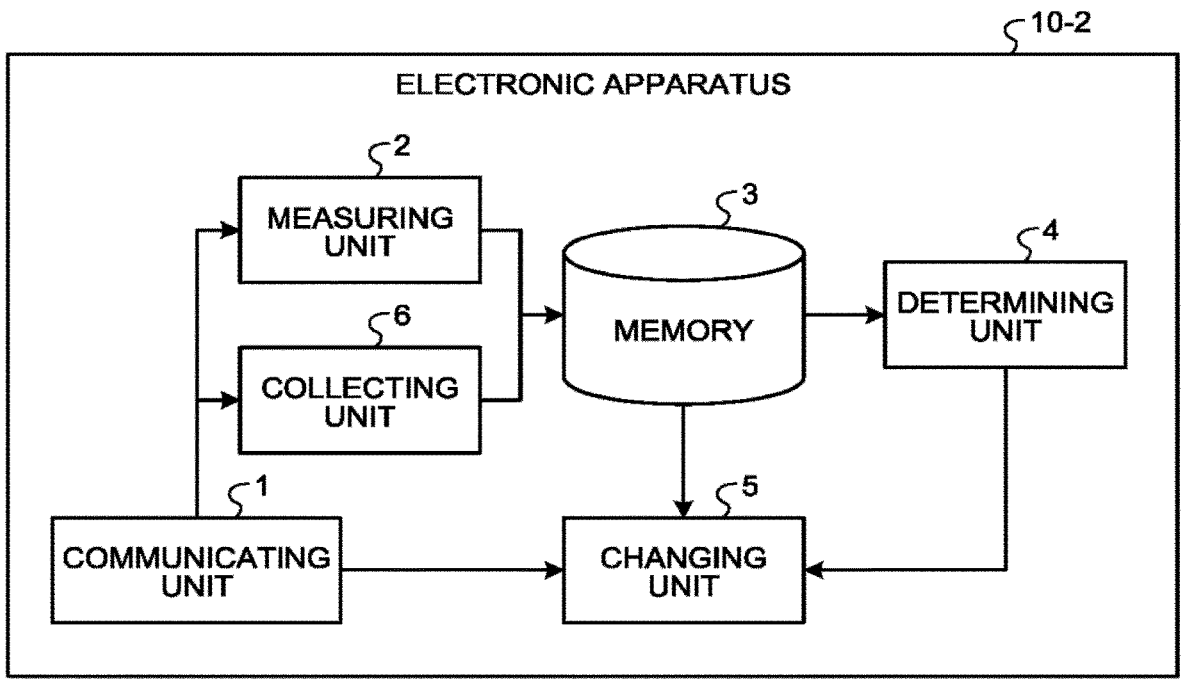
FIG. 6 is a diagram illustrating an example of a functional configuration of an electronic apparatus in a third embodiment.

FIG. 6 is a diagram illustrating an example of a functional configuration of an electronic apparatus 10-2 according to the third embodiment. The electronic apparatus 10-2 in the third embodiment includes a communicating unit 1, a measuring unit 2, a memory 3, a determining unit 4, a changing unit 5, and a collecting unit 6. In the third embodiment, the collecting unit 6 is added.

Since the descriptions with regard to the communicating unit 1 and the measuring unit 2 are the same as those in the first embodiment, the descriptions will be omitted.

The collecting unit 6 collects information on a next hop (third information). The information on a next hop includes, for example, a link throughput between a next hop and a hop next to the next hop and the transmission bit rate of a packet transmitted from the next hop to a hop next to the next hop.

The memory 3 stores therein information. The memory 3 stores therein, for example, information on a packet measured by the measuring unit 2 and information on a next hop collected by the collecting unit 6.

The determining unit 4 determines on the basis of information on a packet measured by the measuring unit 2 whether to change the communication control information. Specifically, the determining unit 4 determines whether the ratio (first ratio) of a transmission bit rate included in the information on the packet to a link throughput included in information (first information) on a packet is equal to or less than a threshold (first threshold).

In the case where the first ratio is larger than the first threshold, the changing unit 5 changes the communication control information such that the first ratio becomes equal to or less than the first threshold and a second ratio indicating a ratio of a transmission bit rate included in the information on the next hop to a link throughput included in information (third information) on a next hop becomes equal to or less than a threshold (second threshold).

Operation Example of Collecting Unit 6

Figure 7:
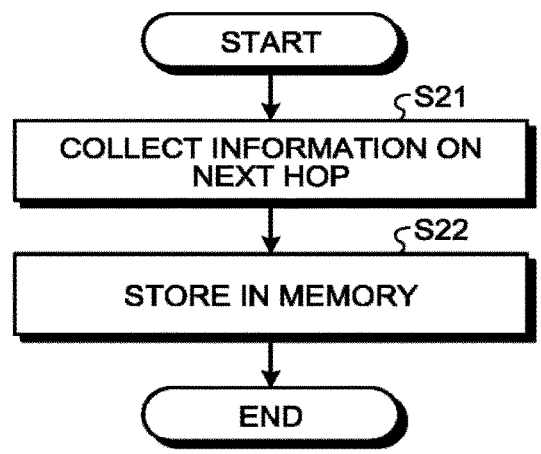
FIG. 7 is a flowchart illustrating an operation example of a collecting unit in the third embodiment.

FIG. 7 is a flowchart illustrating an operation example of the collecting unit 6 in the third embodiment. First, the collecting unit 6 measures, as information on a next hop, a link throughput between the next hop and a hop next to the next hop and the transmission bit rate of a packet transmitted from the next hop to the hop next to the next hop (Step S21).

Next, the collecting unit 6 stores the information on the next hop collected by the process at Step S21 in the memory 3 (Step S22).

Example of Information on Next Hop

FIG. 8A is a diagram illustrating Example 1 of information on a next hop in the third embodiment. FIG. 8A illustrates an example of next hop information with regard to a next hop having a next-hop ID of abcd::2.

FIG. 8B is a diagram illustrating Example 2 of information on a next hop in the third embodiment. FIG. 8B illustrates an example of next hop information with regard to a next hop having a next-hop ID of abcd::3.

The information on a next hop in the third embodiment includes a transmission source ID, a transmission destination ID, a link throughput, and a transmission bit rate.

The transmission source ID is identification information that identifies a transmission source. To the transmission source ID, a Next-hop ID (refer to FIG. 4A) that identifies a next hop of the electronic apparatus 10 is set.

The transmission destination ID is identification information that identifies a transmission destination. To the transmission destination ID, an IPv6 address of a hop next to a next hop is set.

The link throughput indicates a communication speed between a next hop and a hop next to the next hop.

The transmission bit rate indicates the bit rate of data having been actually transmitted between a next hop and a hop next to the next hop.

With the above-mentioned communication control information in FIG. 4A and the information on a next hop in FIGS. 8A and 8B, an operation of the changing unit 5 in the third embodiment will be described.

In the case where a threshold (first threshold) to be used for a determining process by the determining unit 4 is 90%, among data to be transmitted to a next hop having a next-hop ID of abcd::1, the changing unit 5 distributes data corresponding in amount to 5% of a transmission bit rate to another next hop. At this time, the changing unit 5 considers room for adjusting the transmission bit rate of a next hop by referring to the information on the next hop in FIGS. 8A and 8B.

In an example in FIG. BA, the transmission bit rate of a link between a next hop (abcd::2) and a hop (abcd::11, abcd::12, abcd::13) next to the next hop has already been 90% of the corresponding link throughput. Therefore, when distributing data corresponding in amount to 5% of the transmission bit rate to another next hop, there is no room in the next hop (abcd::2) for adjustment of the transmission bit rate, and thus the changing unit 5 does not select the next hop (abcd::2).

On the other hand, in an example in FIG. 8B, the transmission bit rate of a link between a next hop (abcd::3) and a hop (abcd::14) next to the next hop is 50% of the link throughput of the link. Therefore, in the transmission bit rate of the link between the next hop (abcd::3) and the hop (abcd::14) next to the next hop, there is room for adjustment of the remaining 40%.

Moreover, the transmission bit rate of the link between a next hop (abcd::3) and a hop (abcd::15) next to the next hop is 80% of the link throughput of the link. Therefore, in the transmission bit rate of the link between the next hop (abcd::3) and the hop (abcd::15) next to the next hop, there is room for adjustment of the remaining 10%.

Moreover, the transmission bit rate of the link between a next hop (abcd::3) and a hop (abcd::16) next to the next hop is 60% of the link throughput of the link. Therefore, in the transmission bit rate of the link between the next hop (abcd::3) and the hop (abcd::16) next to the next hop, there is room for adjustment of the remaining 30%.

Therefore, when distributing data corresponding in amount to 5% of a transmission bit rate to another next hop, the changing unit 5 selects the next hop (abcd::3). Successively, the changing unit 5 distributes the data of the transmission target such that the transmission bit rate of a packet transmitted to a next hop having a next-hop ID of abcd::1 becomes between 95 and 90 and the transmission bit rate of a packet transmitted to a next hop having a next-hop ID of abcd::3 becomes between 70 and 75.

As described in the above, in the electronic apparatus 10-2 according to the third embodiment, the collecting unit 6 collects information on a next hop. With this, the changing unit 5 can change the communication control information while considering room for adjustment of the transmission bit rate of a link between a next hop and a hop next to the next hop. Accordingly, it is possible to prevent delay and congestion of a packet more certainly.

Modified Example of Third Embodiment

Next, a modified example of the third embodiment will be described. In the description of the modified example, description similar to that in the third embodiment will be omitted. In the modified example, description is given for a case where transmission/reception statistics values are collected also from adjacent electronic apparatuses and the ratio of a transmission bit rate to a link throughput is adjusted within a predetermined range for each priority of packets.

Figures 9, 10:
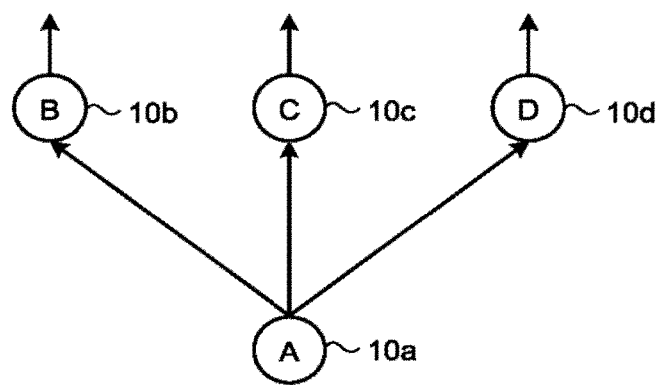
FIG. 9 is a diagram illustrating an example of information on a next hop in a modified example of the third embodiment.
FIG. 10 is a diagram illustrating an example of a connection relation between an electronic apparatus and a next hop in a fourth embodiment.

FIG. 9 is a diagram illustrating an example of information on a next hop in a modified example of the third embodiment. The information on a next hop in the modified example includes a transmission source ID, a transmission destination ID, a link throughput, and a transmission bit rate for each priority.

Since the descriptions with regard to the transmission source ID, the transmission destination ID, and the link throughput are the same as those in the third embodiment, the descriptions will be omitted.

The transmission bit rate in the modified example includes the transmission bit rate of a high-priority packet and the transmission bit rate of a low-priority packet. By holding a high-priority packet and a low-priority packet separately, it is possible to perform communication control for each priority.

According to the modified example of the third embodiment, the changing unit 5 can change the communication control information while considering room for adjustment of a transmission bit rate for each priority of a link between a next hop and a hop next to the next hop. Accordingly, it is possible to prevent more certainly delay and congestion of a packet for each priority.

Fourth Embodiment

Next, the fourth embodiment will be described. In the description in the fourth embodiment, the description similar to that in the first embodiment will be omitted. In the fourth embodiment, description is given for a case where packets are distributed to a plurality of other next hops.

FIG. 10 is a diagram illustrating an example of a connection relation between an electronic apparatus 10a and other electronic apparatuses (next hop) 10b to 10d in the fourth embodiment. The electronic apparatus 10a transmits packets to the next hops 10b to 10d in accordance with the communication control information that controls communication.

Figure 11:
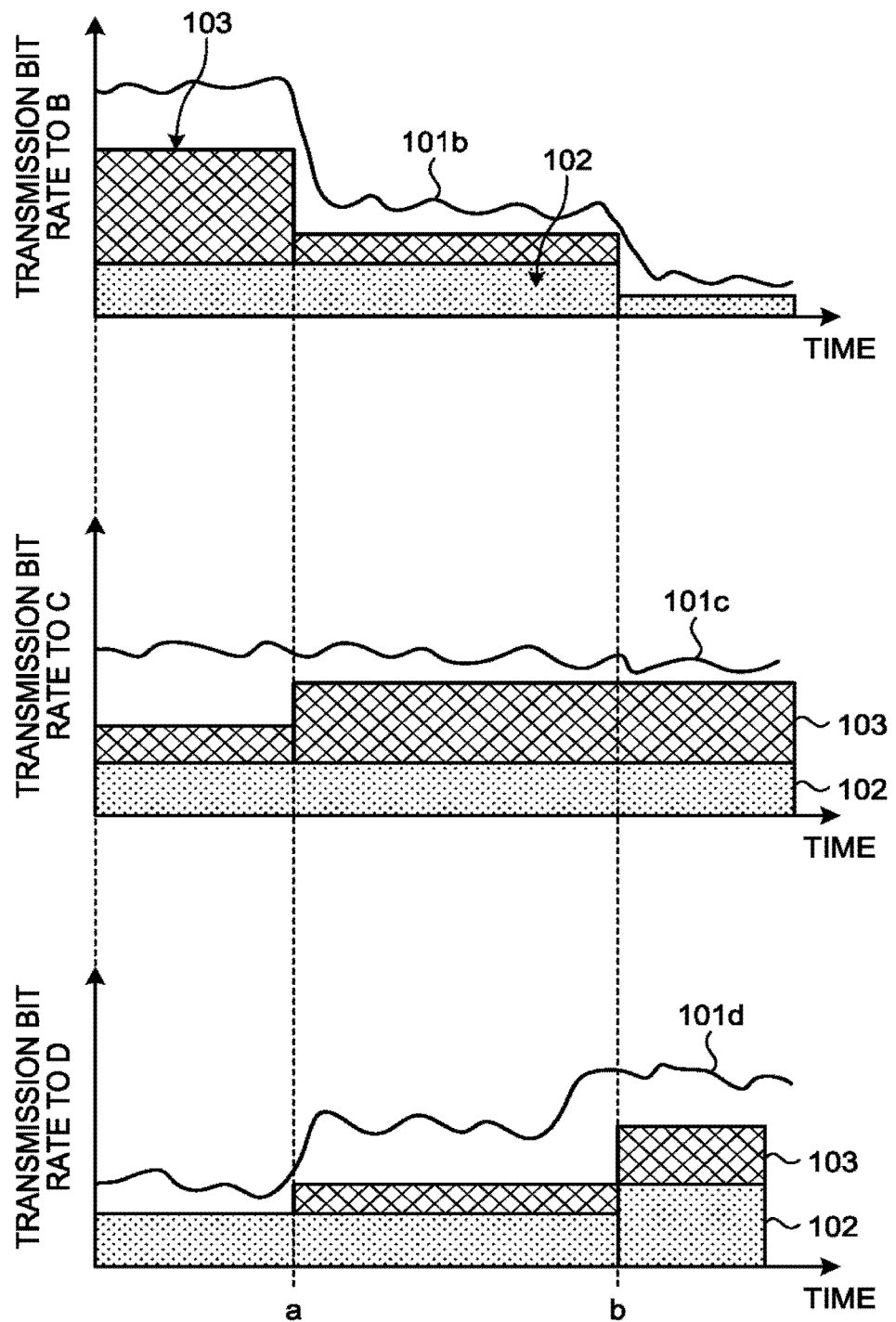
FIG. 11 is a diagram illustrating an example of a link throughput and a transmission bit rate in the fourth embodiment.

FIG. 11 is a diagram illustrating an example of a link throughput and a transmission bit rate in the fourth embodiment. A reference number 101b indicates a link throughput between the electronic apparatus 10a and a next hop 10b. A reference number 101c indicates a link throughput between the electronic apparatus 10a and a next hop 10c. A reference number 101d indicates a link throughput between the electronic apparatus 10a and a next hop 10d.

Moreover, a packet 102 indicates a high-priority packet of the electronic apparatus 10a, and a packet 103 indicates a low-priority packet of the electronic apparatus 10a.

The time "a" in FIG. 11 indicates a time point when the ratio (first ratio) of a transmission bit rate to the link throughput 101b is larger than a threshold (first threshold). The changing unit 5 changes the communication control information such that the transmission bit rate of a packet transmitted to the next hop 10b becomes equal to or less than a threshold. Specifically, the changing unit 5 distributes part of the low-priority packets to be transmitted to the next hop 10b to the next hops 10c and 10d at the time point of the time "a".

The time "b" in FIG. 11 indicates a time point when the ratio (first ratio) of a transmission bit rate to the link throughput 101b is larger again than the threshold (first threshold). The changing unit 5 changes the communication control information such that the transmission bit rate of a packet transmitted to the next hop 10b becomes equal to or less than a threshold. Specifically, the changing unit 5 distributes the low-priority packets 103 to be transmitted to the next hop 10b to the next hop 10d at the time point of the time "b". In this connection, at the time point of the time "b", since there is a possibility that the ratio of a transmission bit rate in the next hop 10c to the link throughput 101c exceeds a threshold, the changing unit 5 does not select the next hop 10c as a distribution destination.

Namely, in the case where the ratio (first ratio) of the next hop identified by the first identification information is larger than a threshold (first threshold), the changing unit 5 of the electronic apparatus 10a reduces the transmission bit rate of the next hop identified by the first identification information and increases the transmission bit rate of a plurality of next hops other than the next hop identified by the first identification information by an amount by which the transmission bit rate is reduced, such that the first ratio becomes equal to or less than the first threshold.

As described in the above, the electronic apparatus 10 according to the fourth embodiment can, by distributing packets to a plurality of other next hops so as to suppress the ratio of the transmission bit rate of a high-priority packet to a link throughput between the electronic apparatus 10a and a next hop to a predetermined level, prevent delay and congestion of a packet.

Finally, an example of a hardware configuration of the electronic apparatus 10 (10-2) in the first to fourth embodiments will be described.

Example of Hardware Configuration

Figure 12:
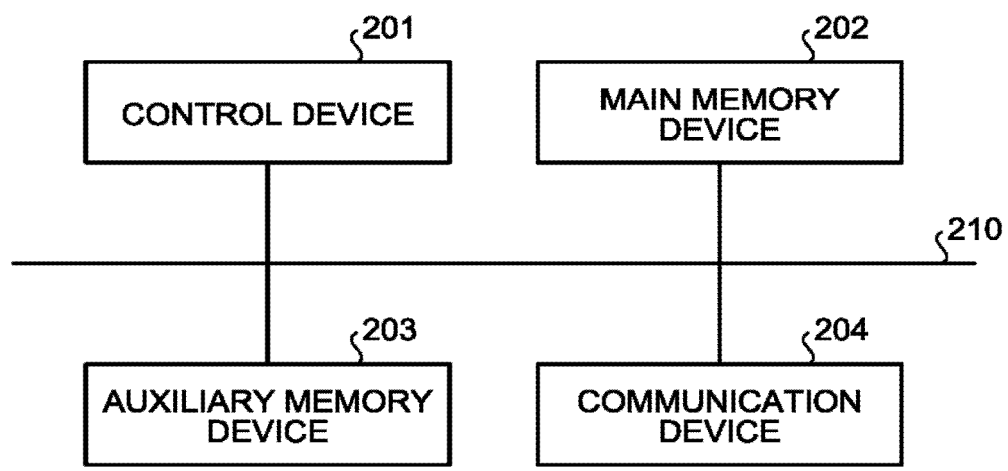
FIG. 12 is a diagram illustrating an example of hardware configuration of an electronic apparatus in the first to fourth embodiments.

FIG. 12 is a diagram illustrating an example of the hardware configuration of the electronic apparatus 10 (10-2) in the first to fourth embodiments. The electronic apparatus 10 includes a control device 201, a main memory device 202, an auxiliary memory device 203, and a communication device 204. The control device 201, the main memory device 202, the auxiliary memory device 203, and the communication device 204 are connected through a bus 210.

The control device 201 executes a computer program read out from the auxiliary memory device 203 to the main memory device 202. The main memory device 202 is a memory such as a read only memory (ROM) and a random access memory (RAM). The auxiliary memory device 203 is a memory card and the like.

The communication device 204 is an interface for communicating with other electronic apparatuses 10 and the like.

Computer programs to be executed in the electronic apparatus 10 are recorded in a computer readable memory medium, such as a CD-ROM, a memory card, a CD-R, and a digital versatile disc (DVD), as a file of an installable format or an executable format and provided as a computer program product.

Moreover, the computer programs to be executed in the electronic apparatus 10 may be stored on a computer connected to a network such as the internet, and may be provided by being downloaded via the network. Moreover, the computer programs to be executed in the electronic apparatus 10 may be provided via a network such as the Internet without being downloaded.

Moreover, the computer programs for use in the electronic apparatus 10 may be provided by being incorporated in a ROM or the like in advance.

Among the above-mentioned functional blocks in FIG. 1 and FIG. 6, computer programs to be executed in the electronic apparatus 10 are constituted in a module including functional blocks implementable also by computer programs. When the control device 201 reads out computer programs from a memory medium and executes the computer programs, each of the above-described functional blocks is loaded as actual hardware on the main memory device 202. That is, each of the above-described function blocks is created on the main memory device 202.

In this connection, part or all of the above-described function blocks in FIG. 1 and FIG. 6 may be implemented by hardware, such as an integrated circuit (IC) and the like without being implemented by software.

Moreover, in the case of implementing a plurality of functions by using a plurality of processors, each processor may implement one of the functions, or may implement two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
communication circuitry configured to transmit a first packet to a first next hop and transmit a second packet to a second next hop in accordance with communication control information; and
processing circuitry configured to:
measure first information on the first packet transmitted to the first next hop;
measure second information on the second packet transmitted to the second next hop;
determine whether to change the communication control information based on both the first information and the second information; and
change the communication control information if it is determined to change the communication control information, wherein
the first information includes a link throughput between the electronic apparatus and the first next hop and a transmission bit rate of the first packet transmitted to the first next hop,
the communication control information includes identification information that identifies a next hop, a link throughput between the electronic apparatus and the next hop, and a transmission bit rate of a packet to be transmitted to the next hop,
the communication circuitry transmits the packet to the next hop identified by the identification information at the transmission bit rate included in the communication control information,
the processing circuitry determines whether a first ratio indicating a ratio of the transmission bit rate included in the first information to the link throughput included in the first information is equal to or less than a first threshold, and if the first ratio is larger than the first threshold, the processing circuitry changes the communication control information such that the first ratio becomes equal to or less than the first threshold.

2. The apparatus according to claim 1, wherein
the processing circuitry measures the first information for each priority of the packets, and
the first information includes a link throughput between the electronic apparatus and the first next hop and a transmission bit rate of the first packet transmitted to the first next hop for each priority.

3. The apparatus according to claim 2, wherein
the communication control information includes identification information that identifies a next hop, a link throughput between the electronic apparatus and the next hop, transmission bit rates of packets to be transmitted to the next hop, and priorities of the packets, and
the communication circuitry transmits packets having set priorities to the next hop identified by the identification information at transmission bit rates set by the communication control information for respective priorities.

4. The apparatus according to claim 2, wherein
the processing circuitry determines whether a first ratio indicating a ratio of a transmission bit rate for each priority included in the first information to the link throughput included in the first information is equal to or less than a first threshold, and
if the first ratio is larger than the first threshold, the processing circuitry changes the communication control information such that the first ratio becomes equal to or less than the first threshold.

5. The apparatus according to claim 1, wherein
the processing circuitry further configured to collect third information including a link throughput between a next hop and a hop next to the next hop and a transmission bit rate of a third packet transmitted from the next hop to the hop next to the next hop, wherein
the processing circuitry determines whether a first ratio indicating a ratio of the transmission bit rate included in the first information to the link throughput included in the first information is equal to or less than a first threshold, and
if the first ratio is larger than the first threshold, the processing circuitry changes the communication control information such that the first ratio becomes equal to or less than the first threshold and a second ratio indicating a ratio of the transmission bit rate included in the third information to the link throughput included in the third information becomes equal to or less than a second threshold.

6. The apparatus according to claim 1, wherein if the first ratio of the next hop identified by the first identification information is larger than the first threshold, the processing circuitry reduces a transmission bit rate of the next hop identified by the first identification information and increases transmission bit rates of a plurality of next hops other than the next hop identified by the first identification information by an amount by which the transmission bit rate is reduced, such that the first ratio becomes equal to or less than the first threshold.

7. A wireless communication method comprising:
transmitting a first packet to a first next hop and transmitting a second packet to a second next hop in accordance with communication control information;
measuring first information on the first packet transmitted to the first next hop;
measuring second information on the second packet transmitted to the second next hop;
determining whether to change the communication control information based on both the first information and the second information; and
changing the communication control information if it is determined to change the communication control information is to be changed, wherein
the first information includes a link throughput between an electronic apparatus and the first next hop and a transmission bit rate of the first packet transmitted to the first next hop,
the communication control information includes identification information that identifies a next hop, a link throughput between the electronic apparatus and the next hop, and a transmission bit rate of a packet to be transmitted to the next hop,
the transmitting transmits the packet to the next hop identified by the identification information at the transmission bit rate included in the communication control information,
the determining determines whether a first ratio indicating a ratio of the transmission bit rate included in the first information to the link throughput included in the first information is equal to or less than a first threshold, and
if the first ratio is larger than the first threshold, the changing changes the communication control information such that the first ratio becomes equal to or less than the first threshold.

8. A computer program product comprising a non-transitory computer readable medium including programmed instructions, the instructions causing a computer to function as:
a communicating unit configured to transmit a first packet to a first next hop and transmit a second packet to a second next hop in accordance with communication control information;
a measuring unit configured to measure first information on the first packet transmitted to the first next hop and measure second information on the second packet transmitted to the second next hop;
a determining unit configured to determine whether to change the communication control information based on both the first information and the second information; and
a changing unit configured to change the communication control information if it is determined to change the communication control information is to be changed, wherein
the first information includes a link throughput between an electronic apparatus and the first next hop and a transmission bit rate of the first packet transmitted to the first next hop,
the communication control information includes identification information that identifies a next hop, a link throughput between the electronic apparatus and the next hop, and a transmission bit rate of a packet to be transmitted to the next hop,
the communicating unit transmits the packet to the next hop identified by the identification information at the transmission bit rate included in the communication control information, the determining unit determines whether a first ratio indicating a ratio of the transmission bit rate included in the first information to the link throughput included in the first information is equal to or less than a first threshold, and
if the first ratio is larger than the first threshold, the changing unit changes the communication control information such that the first ratio becomes equal to or less than the first threshold.

* * * * *